United States Patent
Leppanen et al.

(10) Patent No.: US 10,224,020 B1
(45) Date of Patent: Mar. 5, 2019

(54) APPARATUS AND METHOD FOR PROCESSING VOLUMETRIC AUDIO

(71) Applicant: Nokia Technologies Oy, Espoo (FI)

(72) Inventors: Jussi Artturi Leppanen, Tampere (FI); Antti Johannes Eronen, Tampere (FI); Arto Juhani Lehtiniemi, Lempaala (FI); Tapani Johannes Pihlajakuja, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/835,612

(22) Filed: Dec. 8, 2017

(51) Int. Cl.
*G10K 15/08* (2006.01)
*G10K 15/02* (2006.01)
*H04S 7/00* (2006.01)

(52) U.S. Cl.
CPC ............ *G10K 15/08* (2013.01); *G10K 15/02* (2013.01); *H04S 7/306* (2013.01); *H04S 7/301* (2013.01); *H04S 2400/11* (2013.01); *H04S 2420/13* (2013.01)

(58) Field of Classification Search
CPC .. H04S 2400/11; H04S 7/301; H04S 2420/13; H04S 7/306; G10K 15/02; G10K 15/08
USPC .......................................................... 381/17
See application file for complete search history.

(56) References Cited

U.S. PATENT DOCUMENTS

| | | | |
|---|---|---|---|
| 9,510,125 B2 | 11/2016 | Raghuvanshi et al. | |
| 2016/0109284 A1* | 4/2016 | Hammershoi | G01H 7/00 73/586 |

FOREIGN PATENT DOCUMENTS

| | | |
|---|---|---|
| WO | WO-2010054360 A1 | 5/2010 |
| WO | WO-2015103024 A1 | 7/2015 |
| WO | WO-2017136573 A1 | 8/2017 |

OTHER PUBLICATIONS

Yan Li, Peter F. Driessen, George Tzanetakis, Steve Bellamy *"Spatial Sound Rendering Using Measured Room Impulse Responses"* 2006 IEEE International Symposium on Signal Processing and Information Technology https://www.researchgate.net/publication/224680126_Spatial_Sound_Rendering_Using_Measured_Room_Impulse_Responses > Sep. 2006.

* cited by examiner

*Primary Examiner* — Paul S Kim
(74) *Attorney, Agent, or Firm* — Harrington & Smith

(57) ABSTRACT

A method including receiving an audio scene including at least one source captured using at least one near field microphone and at least one far field microphone. The method includes determining at least one room-impulse-response (RIR) associated with the audio scene based on the at least one near field microphone and the at least one far field microphone, accessing a predetermined scene geometry corresponding to the audio scene, and identifying a best matching geometry to the predetermined scene geometry in a scene geometry database. The method also includes performing RIR comparison based on the at least one RIR and at least one geometric RIR associated with the best matching geometry, and rendering a volumetric audio scene experience based on a result of the RIR comparison.

20 Claims, 14 Drawing Sheets

APPARATUS AND METHOD FOR PROCESSING VOLUMETRIC AUDIO

BACKGROUND

Technical Field

The exemplary and non-limiting embodiments relate to volumetric audio, and more generally to virtual reality (VR) and augmented reality (AR).

Brief Description of Prior Developments

There have been different stages in the evolution of virtual reality. At the three-degrees-of-freedom (3-DoF) stage methods and systems are provided that take head rotation in three axes yaw/pitch/roll into account. This facilitates the audio-visual scene remaining static in a single location as the user rotates their head. The next stage of virtual reality may be referred as 3-DoF plus (3-DoF+), which may facilitate, in addition to the head rotation, limited movement (translation, represented in Euclidean spaces as x, y, and z). For example, the movement may be limited to a range of some tens of centimeters around a location. An ultimate stage, 6-DoF volumetric virtual reality, may provide for the user to freely move in a Euclidean space (x, y, and z) and rotate their head (yaw, pitch, and roll).

SUMMARY

The following summary is merely intended to be exemplary. The summary is not intended to limit the scope of the claims.

In accordance with one aspect, an example method comprises receiving an audio scene including at least one source captured using at least one source using at least one near field microphone and at least one far field microphone, determining at least one room-impulse-response (RIR) associated with the audio scene based on the at least one near field microphone and the at least one far field microphone, accessing a predetermined scene geometry corresponding to the audio scene, identifying a best matching geometry to the predetermined scene geometry in a scene geometry database, performing RIR comparison based on the at least one RIR and at least one geometric RIR associated with the best matching geometry, and rendering a volumetric audio scene experience based on a result of the RIR comparison.

In accordance with another aspect, an example apparatus comprises at least one processor; and at least one non-transitory memory including computer program code, the at least one memory and the computer program code configured to, with the at least one processor, cause the apparatus to: receive an audio scene including at least one source captured using at least one source using at least one near field microphone and at least one far field microphone, determine at least one room-impulse-response (RIR) associated with the audio scene, access a predetermined scene geometry corresponding to the audio scene, identify a best matching geometry to the predetermined scene geometry in a scene geometry database, perform RIR comparison based on the at least one RIR and at least one geometric RIR associated with the best matching geometry, and render a volumetric audio scene experience based on a result of the RIR comparison.

In accordance with another aspect, an example apparatus comprises a non-transitory program storage device readable by a machine, tangibly embodying a program of instructions executable by the machine for performing operations, the operations comprising: receiving an audio scene including at least one source captured using at least one source using at least one near field microphone and at least one far field microphone, determining at least one room-impulse-response (RIR) associated with the audio scene, accessing a predetermined scene geometry corresponding to the audio scene, identifying a best matching geometry to the predetermined scene geometry in a scene geometry database, performing RIR comparison based on the at least one RIR and at least one geometric RIR associated with the best matching geometry, and rendering a volumetric audio scene experience based on a result of the RIR comparison.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
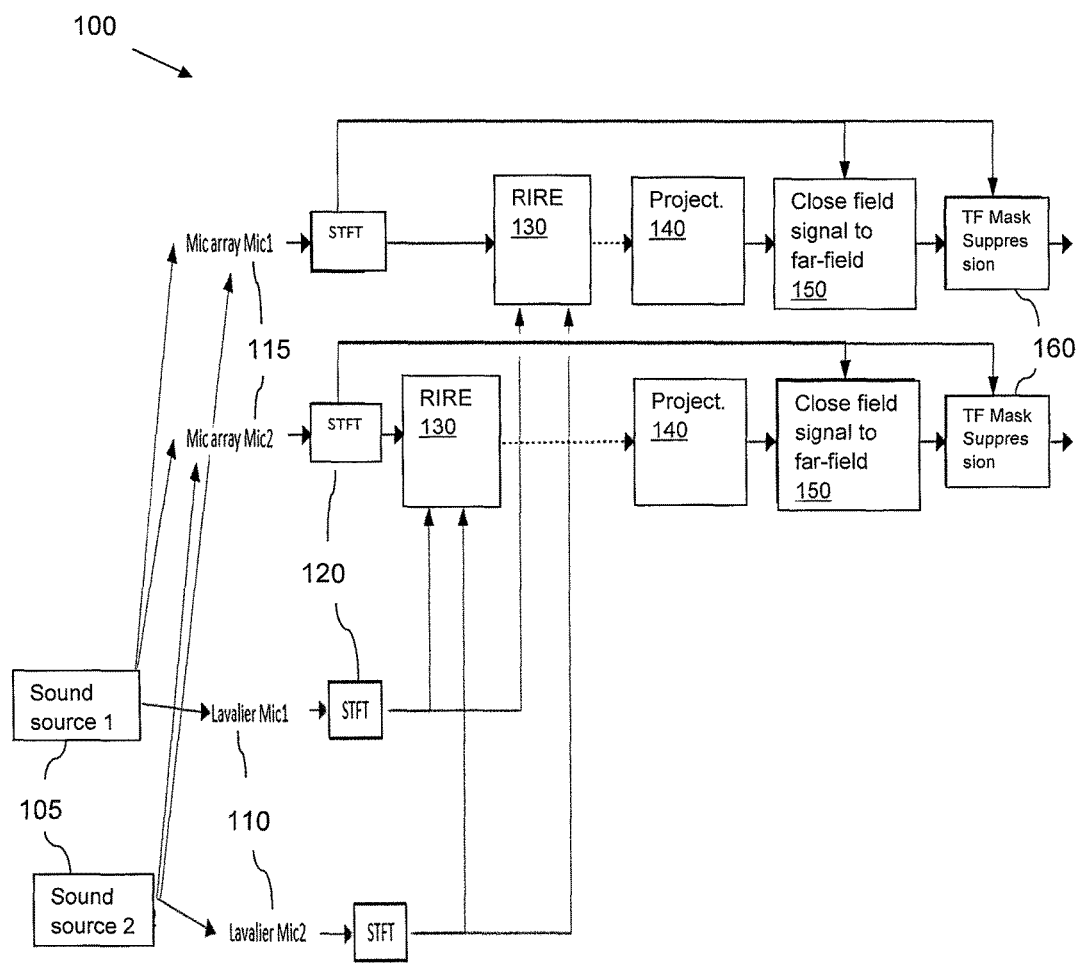
FIG. 1 is a diagram illustrating a room-impulse-response (RIR) estimation system.

Referring to FIG. 1, there is shown a diagram illustrating a diagram illustrating a room-impulse-response (RIR) estimation system 100.

As shown in FIG. 1, RIR estimation system 100 includes sound sources 105, from which audio may be captured by lavalier microphones 110 (shown, by way of example, in FIG. 1 as lavalier Mic1 and Mic 2) and microphone arrays 115 (shown, by way of example, in FIG. 1 as Mic array Mic1 and Mic array Mic2) and thereafter processed.

The sound sources 105 (for example, sound source 1 and sound source 2) may be mostly audible to their respective lavalier microphones 110 and all microphones in the microphone array 115. For example, sound source 1 may be audible to lavalier Mic1 and Mic array Mic1 and Mic array Mic2.

The lavalier microphones 110 are example near-field (for example, close field) microphones which may be in close proximity to a user (for example, worn by a user to allow hands-free operation). Other near-field microphones may include a handheld microphone (not shown), etc. In some embodiments, the near-field microphone may be location tagged. The near-field signals obtained from near-field microphones may be termed "dry signals", in that they have little influence from the recording space and have relatively high signal-to-noise ratio (SNR).

Mic array mics 1 and 2 are examples of far-field microphones 115 that may be located relatively far away from a sound source 105. In some embodiments, an array of far-field microphones may be provided, for example in a mobile phone or in a NOKIA OZO® or similar audio recording apparatus. Devices having multiple microphones may be termed multichannel devices and can detect an audio mixture comprising audio components received from the respective channels.

The microphone signals from far-field microphones may be termed "wet signals", in that they have significant influence from the recording space (for example from ambience, reflections, echoes, reverberation, and other sound sources). Wet signals tend to have relatively low SNR. In essence, the near-field and far-field signals are in different "spaces", near-field signals in a "dry space" and far-field signals in a "wet space".

The audio from the lavalier microphones 110 and microphone arrays 115 may be processed via short-time Fourier transform (STFT) 120 and RIR estimation (RIRE) 130 may be determined. The RIR may be estimated from an external mic captured source to a microphone array, a wet projection (project 140) of the external microphone captured signal may be computed to the array, and a source may be separated from the array. Sound source 1 and Sound source 2 (for example, sound sources 105) may be taken simultaneously into account when estimating the RIRs.

RIRE 130 may estimate RIR from the external microphone to the array microphone, and use the estimated RIR to create a "wet" version of the external microphone signal. This may include the removal or addition of close field signal to far-field signal 150.

In some embodiments RIR filtered (for example, projected) signals may be used as a basis for generating Time/Frequency (T/F) masks 160. Using projected signals improves the quality of the suppression. This is because the projection (for example, filtering with the RIR) converts the "dry" near-field source signal into a "wet" signal and thus the created mask may be a better match to the "wet" far-field microphone captured signals.

The resulting signal, after TF mask suppression, from sound source 1 may include a far field signal (for example, Mic array Mic1 signal) with close field signals (for example, lavalier Mic1 and Mic2 signals) added/removed with the same "wetness" (for example, room effects, etc.) as after repositioning of the close field signals with respect to Mic array Mic1, for example as described with respect to FIGS. 2 to 4 herein below. According to an example embodiment, the associated RIRs and projection may be determined based on mixing multiple lavalier signals to microphone array signals using voice activity detection (VAD) and recursive least squares model (RLS).

For example, the system 100 may receive, via a first track, a near-field audio signal from a near-field microphone; receiving, via a second track, a far-field audio signal from an array comprising one or more far-field microphones, wherein the far-field audio signal comprises audio signal components across one or more channels corresponding respectively to each of the far-field microphones. The system 100 may determine, using the near-field audio signal and/or the component of the far-field audio signal, a set of time dependent room impulse response filters, wherein each of the time dependent room impulse response filters is in relation to the near-field microphone and respective and/or each of the channels of the microphone array. For one or more channels of the microphone array, the system 100 may filter the near-field audio signal using one or more room impulse response filters of the respective one or more channels; and augment the far-field audio signal by applying the filtered near-field audio signal thereto.

This process may provide the frequency domain room response of each source, fixed within each time frame n, which may be expressed as $$h_{f,n,p} = [h_{f,n,1}, \ldots, h_{f,n,M}]$$

where h is the spatial response, f is the frequency index, n is the frame index, and p is the audio source index.

According to an example embodiment in which (it is assumed that) the system is linear and time invariant, a model for the room impulse response (RIR) measurement may be determined based on convolving the sound source signal with the system's impulse response (the RIR) to determine:

$$o(t) = \int_{-\infty}^{\infty} h(\tau) \cdot i(t-\tau) d\tau = h(t) * i(t)$$

where o(t) is the measured signal (captured by the array) and * the convolution operator. If this measured signal is represented with the complex transfer functions by applying the Fourier transform, the resulting equation may be denoted:

$$O(f) = H(f) \cdot I(F)$$

where O(f)=FFT(o(t)), FFT denotes the Fourier transform, and f is the frequency. If a solution for the system transfer function is applied, the resulting equation may be denoted:

$$H(f) = \frac{O(f)}{I(f)}$$

The impulse response can be obtained by taking real part of the inverse Fourier transform (IFFT).

$$h(t) = \text{real}\left(IFFT\left(\frac{O(f)}{I(f)}\right)\right)$$

Maximum length sequences or sinusoidal sweeps with logarithmically increasing frequencies may be used as the sound source signal i(t). The input signal can be a white noise sequence or a sinusoidal sweep. Other processes may be used on other types of input signals. According to example embodiments, methods may operate on any input signals with sufficient frequency content.

With regard to determining whether or a close-up microphone is close enough to the array mic for RIR determination, the system may examine at the cross-correlation between the two signals. If there is a high enough correlation, the system may determine that the audio source recorded by the close-up mic signal is also heard at the mic array and an RIR may be calculated.

When recording a sound scene with a microphone array, for a target 6-DoF experience, a single microphone array audio is not sufficient. In instances which allow the user to move around the scene, the relative directions (and distances) of the sounds are required to change according to the user's position.

Figure 2:
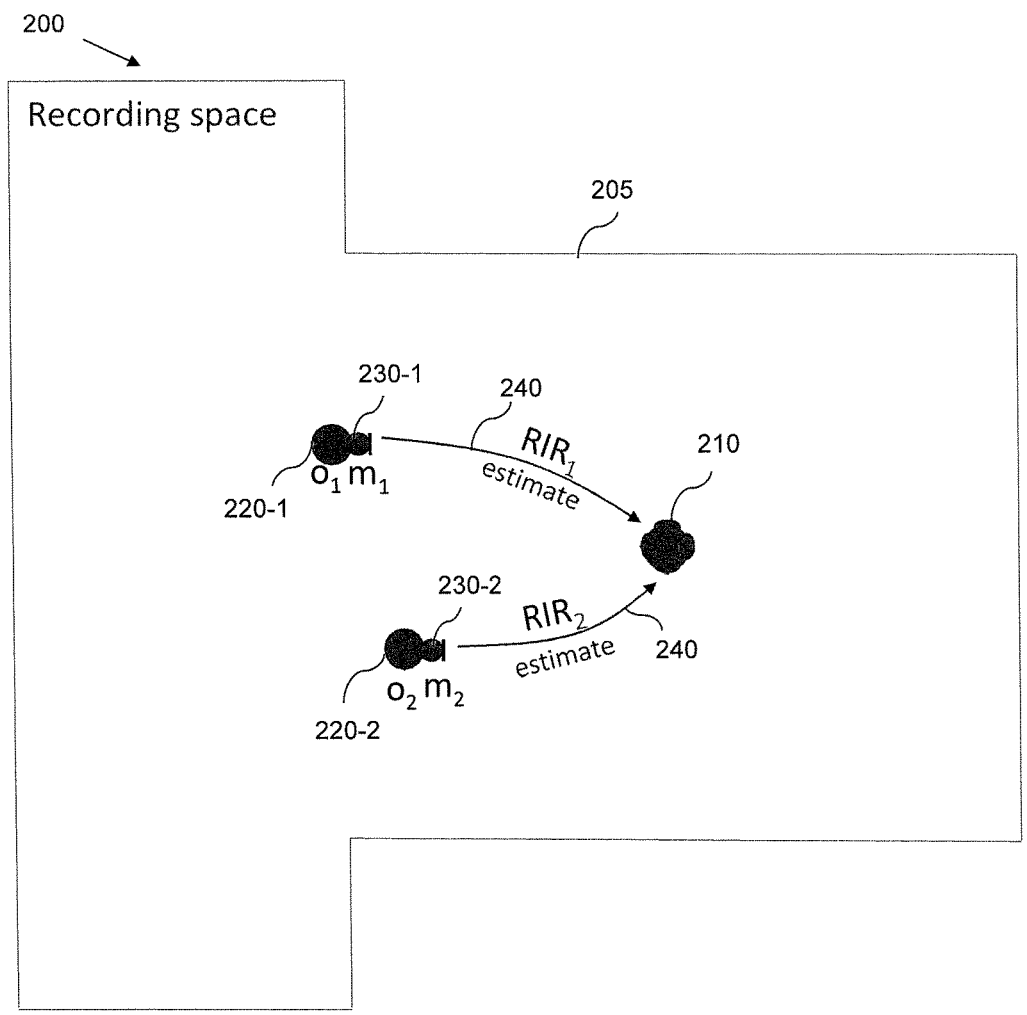
FIG. 2 is a diagram illustrating a recording stage for 6-DoF audio.
Figure 3:
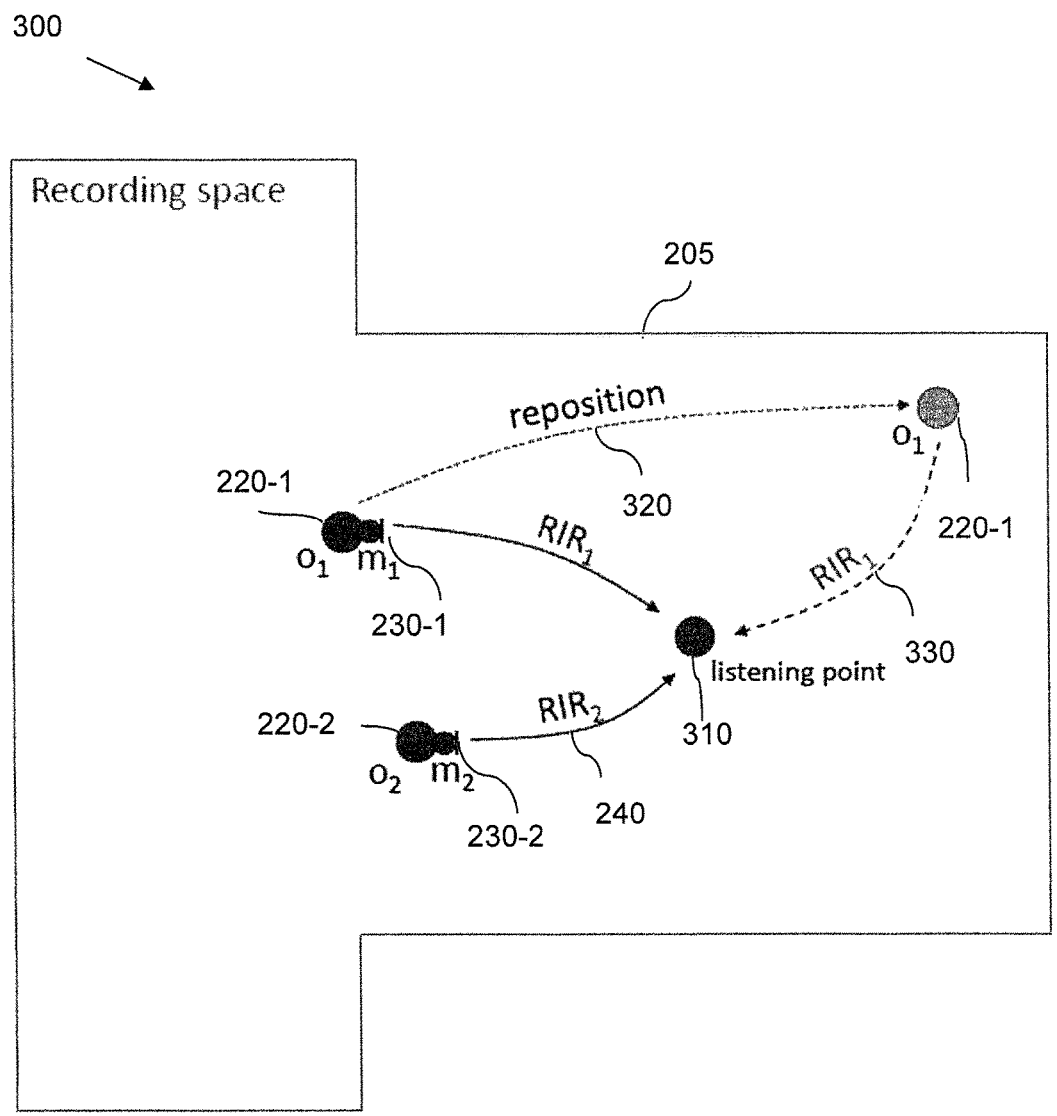
FIG. 3 is a diagram illustrating an experience stage for 6-DoF audio.
Figure 4:
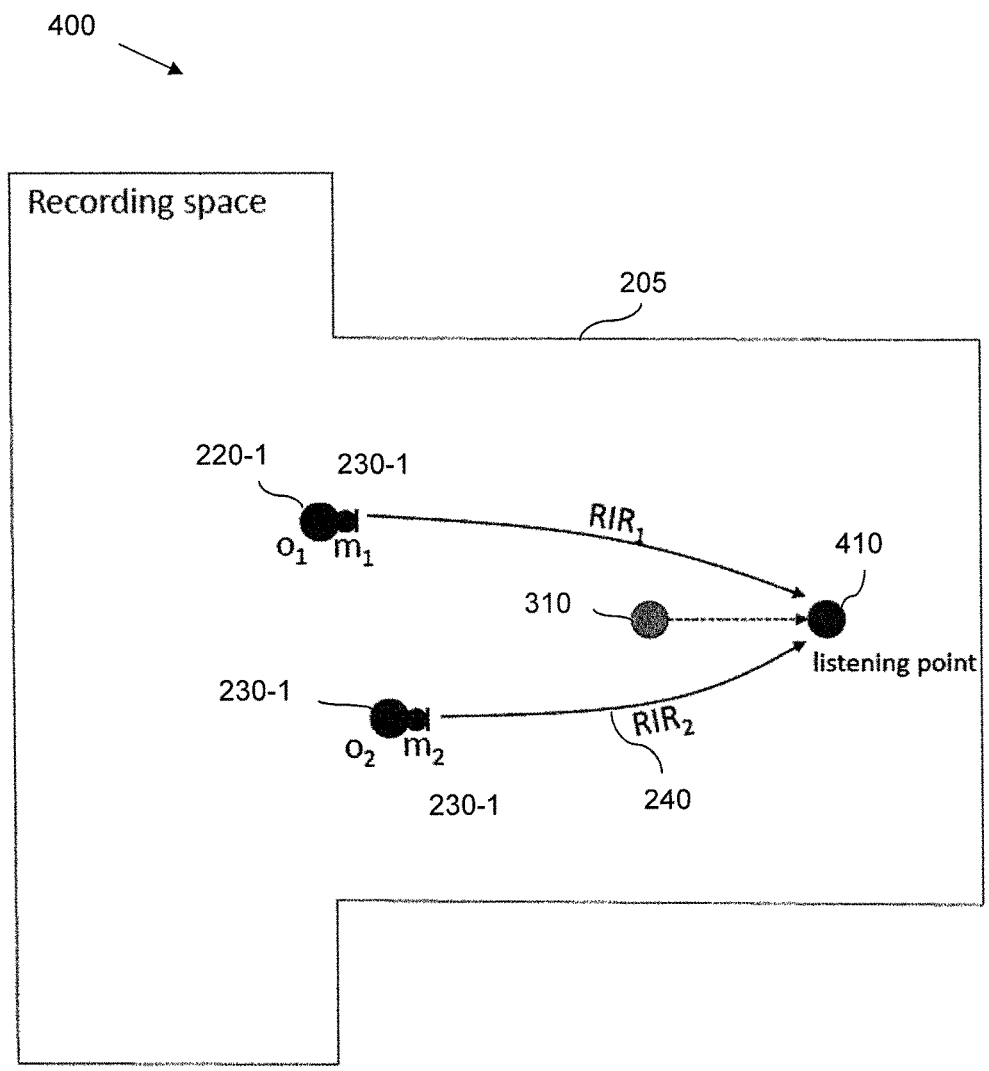
FIG. 4 is another diagram illustrating an experience stage for 6-DoF audio.

FIGS. 2, 3 and 4 show one example of a 6-DoF solution method of determining and applying RIRs (in which RIRs are applied a static manner) (for example, in a recording space 205).

As shown in FIG. 2, a microphone array 210, audio objects 220 (shown as $o_1$ 220-1 and $o_2$ 220-2 by way of example) with corresponding near field microphones 230 (for example, close up microphone $m_1$ 230-1 and $m_2$ 230-2, respectively) may be positioned in a recording space 205. At the recording stage, an audio scene may be captured (for example, recorded) with the microphone array 210 and close-up microphones 230 on important sources. A room impulse response (RIR) may be estimated ($RIR_1$ and $RIR_2$) 240 from each close-up microphone 230 to each microphone of the array 210. The RIRs may be calculated on an (audio) frame-by-frame basis and may thus change over time.

Note that "user movement" as referred to herein is a general term that covers any user movement, for example, changes in (a) head orientation (yaw/pitch/roll) and (b) any changes in user position (done by moving in the Euclidian space (x, y, z) or by limited head movement).

Referring now to FIG. 3, the 6-DoF solution at an experience stage 300 in recording space 205 is illustrated. During playback the wet projections of the dry close-up microphone signals (from the close up microphones 230) may be separated from the microphone array signals (from microphone array 210) using the RIR. After the separation the array signal may contain mostly diffuse ambiance if all dominant sound sources in the scene have been captured with close-up microphones. Note that the separation may be also done prior to the playback stage.

As shown in FIG. 3, at recording space 205, during the experience stage 300, the RIRs may be used during playback to create a 'wet' version of the dry close-up microphone signal and then the 'wet' close-up microphone signal may be separated from the array microphone signals. The close-up microphone signals may be convolved with the RIRs and may be rendered from arbitrary positions in the scene. Convolving the close-up microphone signals with the RIR gives the dry close-up signal 'space' (for example, adds a simulated surrounding environment to the experience) that matches with the recording environment (observed) from a listening point 310. Volumetric playback may then be obtained by mixing the diffuse ambiance with sound objects created from the dry lavalier signals 230 and the wet projections, while creating the sensation of listener position change by applying distance/gain attenuation cues and direct-to-wet ratio to the dry lavalier signal and the wet projection.

However, during playback, in instances in which a source is repositioned (320) there may be a mismatch between the estimated RIR and what the RIR (330) would be if the source was in its new place after repositioning.

Referring now to FIG. 4, further aspects of the 6-DoF solution at an experience stage 400 (for example, in recording space 205) are illustrated. The (position of the) listening point 310 may also change during playback (for example, as illustrated in FIG. 4, to listening point 410). In this instance, the estimated RIRs from the recording stage may again be used. Similar RIR mismatch (listening position different to microphone array recording position) as described with respect to FIG. 3, may occur.

FIGS. 5, 6, 7 and 8 illustrate a process of selecting between simulated and actual RIR for an enhanced 6-DoF solution. As shown in FIGS. 5-8, rendering of volumetric audio may be implemented based on a process that includes selecting between simulated and actual RIR.

While the created experience described in FIGS. 2-4 may provide increased realism when compared to unadjusted signals, improved realism with respect to that solution may be reached (for example, implemented, realized, etc.) when information about the scene geometry is taken in to account.

The capture setup may be similar to that described in FIG. 1, for example, an array capture microphone comprising at least one microphone (for example, near field microphone 230) and an external microphone (far field microphone 210).

Figure 5:
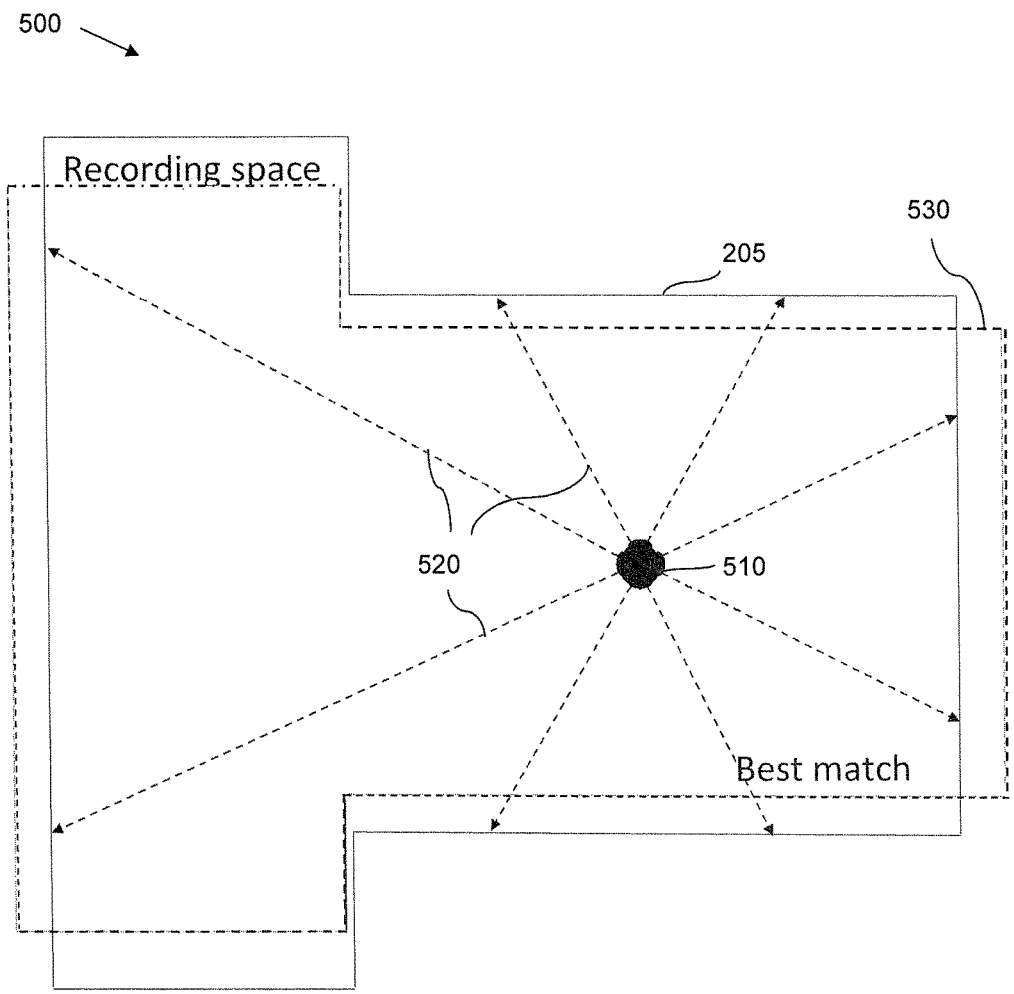
FIG. 5 is a diagram illustrating a pre-recording stage for enhanced 6-DoF audio.
Figure 6:
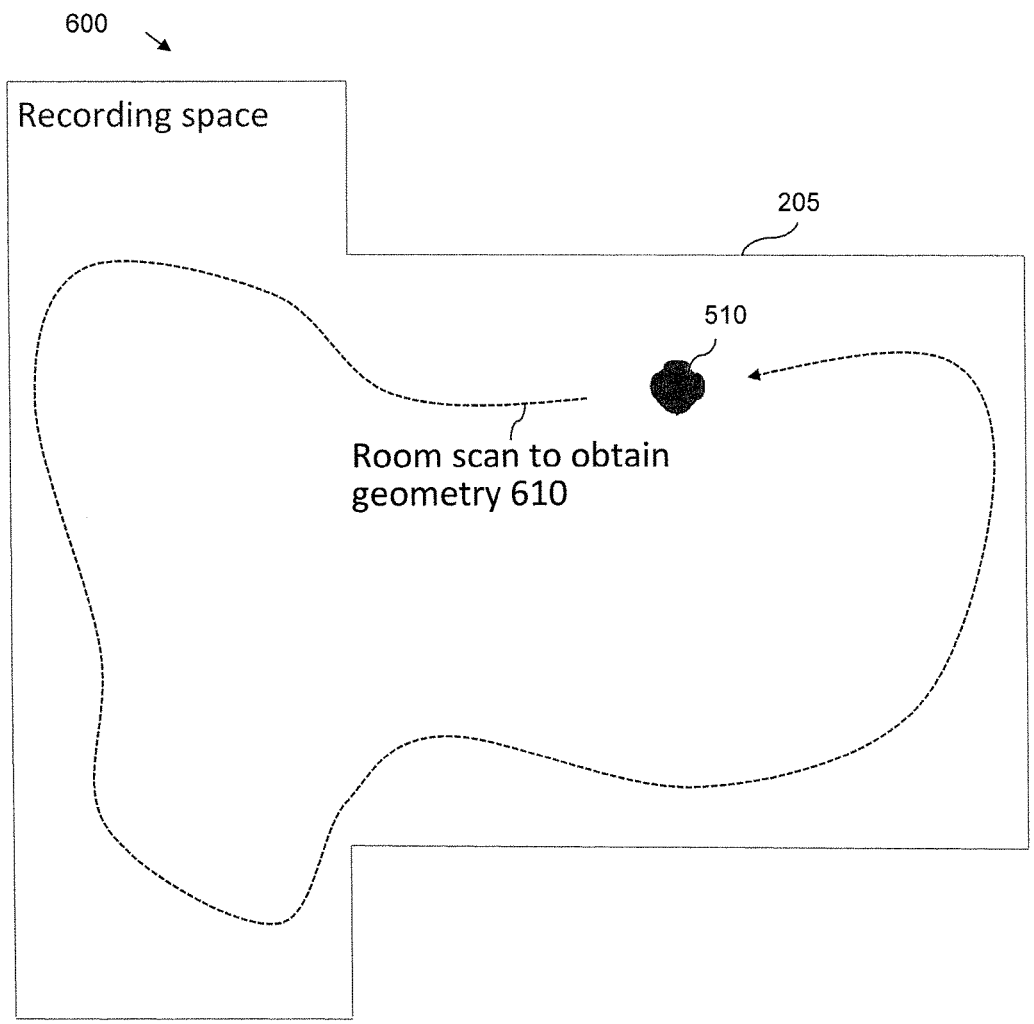
FIG. 6 is a diagram illustrating a pre-recording stage for enhanced 6-DoF audio.

FIGS. 5 and 6 illustrate an enhanced 6-DoF solution (for example, process) for obtaining a predetermined (for example, rough) geometry of the recorded scene. Before recording, at a pre-recording stage, a predetermined (for example, rough) geometry of the recorded scene may be obtained (for example, determined, identified, etc.).

The predetermined geometry may be determined before the audio capture. The predetermined geometry may be used in a process that allows the user to (in some instances, determine whether to) reproduce an audio scene captured in a space with reverberation without actually using the reverberant capture but the clean signal captures and a model of the geometry of the space. The method may require linkage to the recording but the geometry determination as such does not require the recording.

FIG. 5 illustrates an enhanced 6-DoF solution at a pre-recording stage 500 (for example, in recording space 205). The room geometry 520 (for example, of recording space 205) may be determined using cameras/camera arrays 510 and structure from motion algorithms. The enhanced 6-DoF solution may incorporate methods to account for (changes in) RIR associated with user movement. Image analysis, Light Detection and Ranging (LIDAR) data, etc., may be used to infer an approximate (for example, a rough) geometry of the recording space. The rough geometry may be compared against a database of known room geometries (real spaces, virtual spaces) and the best matching one (for example, best match geometry 530) may be found/determined (for example, based on a degree of similarity between the room geometries).

FIG. 6 shows an example of obtaining a rough geometry based on a camera array 510 being moved around the scene 610 while recording in a pre-recording stage of an enhanced 6-DoF solution (for example, in recording space 205). One possibility for room geometry scanning is to move a camera with stereoscopic capture capability around the room 610 before recording and perform structure from motion type processing. The rough geometry may be obtained based on different techniques. For example, structure from motion and photogrammetry may be used to determine the rough geometry. The recorded data may be used to obtain a rough 3D model of the scene using the above mentioned techniques.

Alternatively to scanning the room with a camera array 510, a scan may be performed using an appropriate device (not shown, for example, Microsoft HoloLens type AR Glasses™ or APPLE ARKit™/GOOGLE TANGO equipped mobile phones, etc.). The rough geometry may also be drawn on a touchscreen. The rough geometry may also be obtained as a stored model of the space. The latter examples may be preferable over the use of cameras in instances in which a 6DoF audio solution is being implemented and thus no cameras are required for the content recording.

The resulting model may not have information about the surface materials present in the scene. As the characteristics of different surface materials may have impact (in some instances, very large impact) on how they reflect sound, the obtained 3D models cannot be directly used to effectively create the wet versions of the dry close-up microphone signals.

Figure 7:
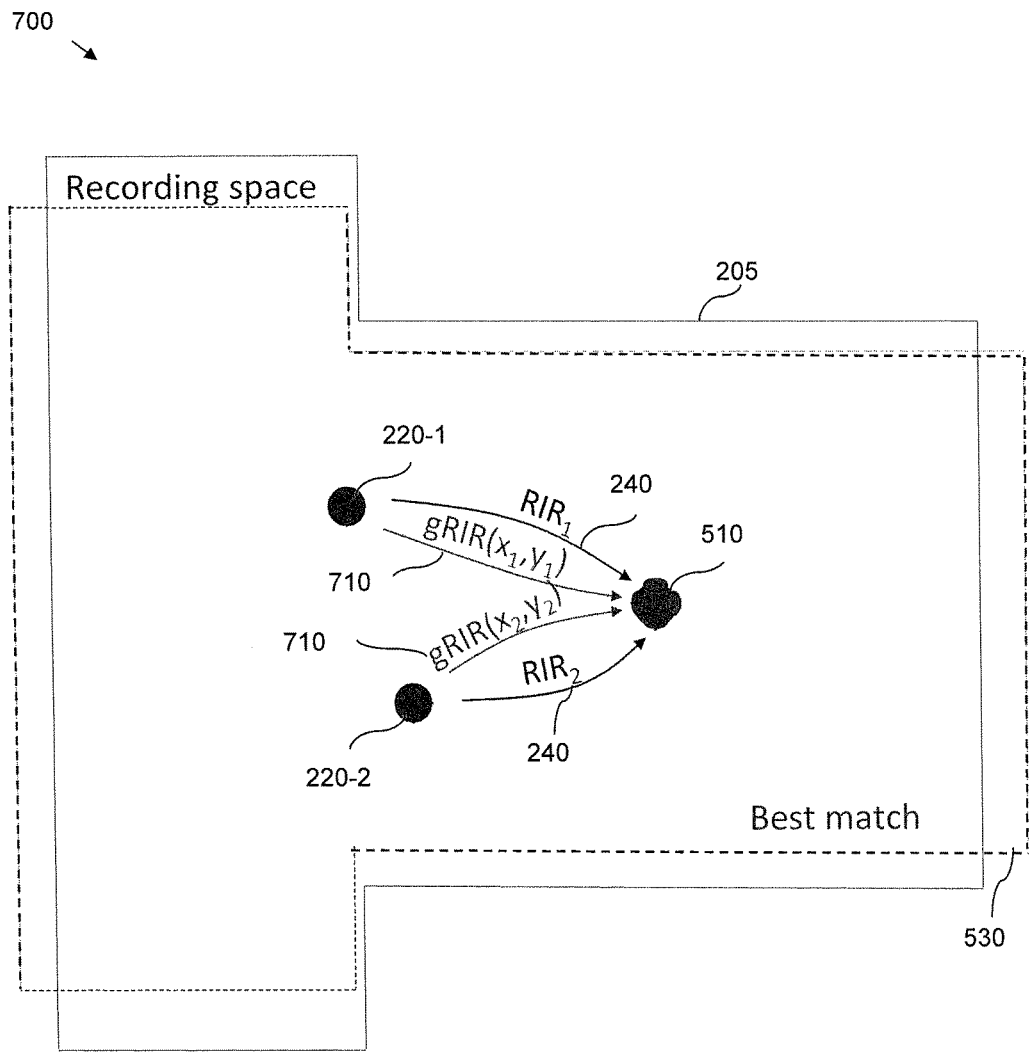
FIG. 7 is a diagram illustrating a recording stage for enhanced 6-DoF audio.

FIG. 7 illustrates a recording stage 700 of an enhanced 6-DoF solution (for example, in recording space 205).

A room impulse response (RIR) 240 may be estimated from each close-up microphone to each microphone of the array 510. Room-impulse-response (RIR) may be estimated from the external microphone 210 to the array microphone 510, and used to create a "wet" version of the external microphone signal. The wet version of the external microphone signal may be separated from the array capture to create a residual signal. If all the dominant sources in the capture environment are equipped with external microphones, the residual after separation may be mostly diffuse ambiance. RIRs may be used during playback to create a "wet" version of the dry close-up microphone signal. During playback, the "wet" version of the dry close-up microphone signal may be mixed with the dry close-up microphone signal at appropriate ratios depending on the distance, to adjust the direct to reverberant ratio. Note that there may be two 'wet' versions of each dry close-up signal: one used for separation and one used for playback.

A geometric RIR (gRIR) 710 based on the best matching (for example, known) geometry 530 may also be calculated. gRIR 710 may be determined based, for example, on game engine type processing, virtual acoustic simulation, database of RIRs, etc.

The RIRs 240 ($RIR_1$ and $RIR_2$) and gRIRs 710 (gRIR ($x_1$, $y_1$) and GRIR ($x_2$, $y_2$)) may be compared and if they are within a predetermined threshold (or degree) of similarity, the gRIRs 710 may be used during playback. If the RIRs 240 and gRIRs 710 are not within the predetermined threshold, the RIRs 240 may be used.

In other words, the wet versions of the dry signals may be obtained by convolving the dry signal with RIRs 240 or based on gRIRs 710 obtained from the geometry. The decision is based on the closeness of these two RIRs (RIRs 240 and gRIR 710). Thus, the rendering may be done in one of two ways. The RIR 240 may be used to create the residual ambience signal and the gRIRs 710 obtained using the room geometry may be used to create a "wet" version of the dry signal for rendering the sound sources. Alternatively, in instances in which the RIRs 240 and the gRIRs 710 are not close enough, RIRs 240 may be used for both ambience creation and wet signal obtaining.

Figure 8:
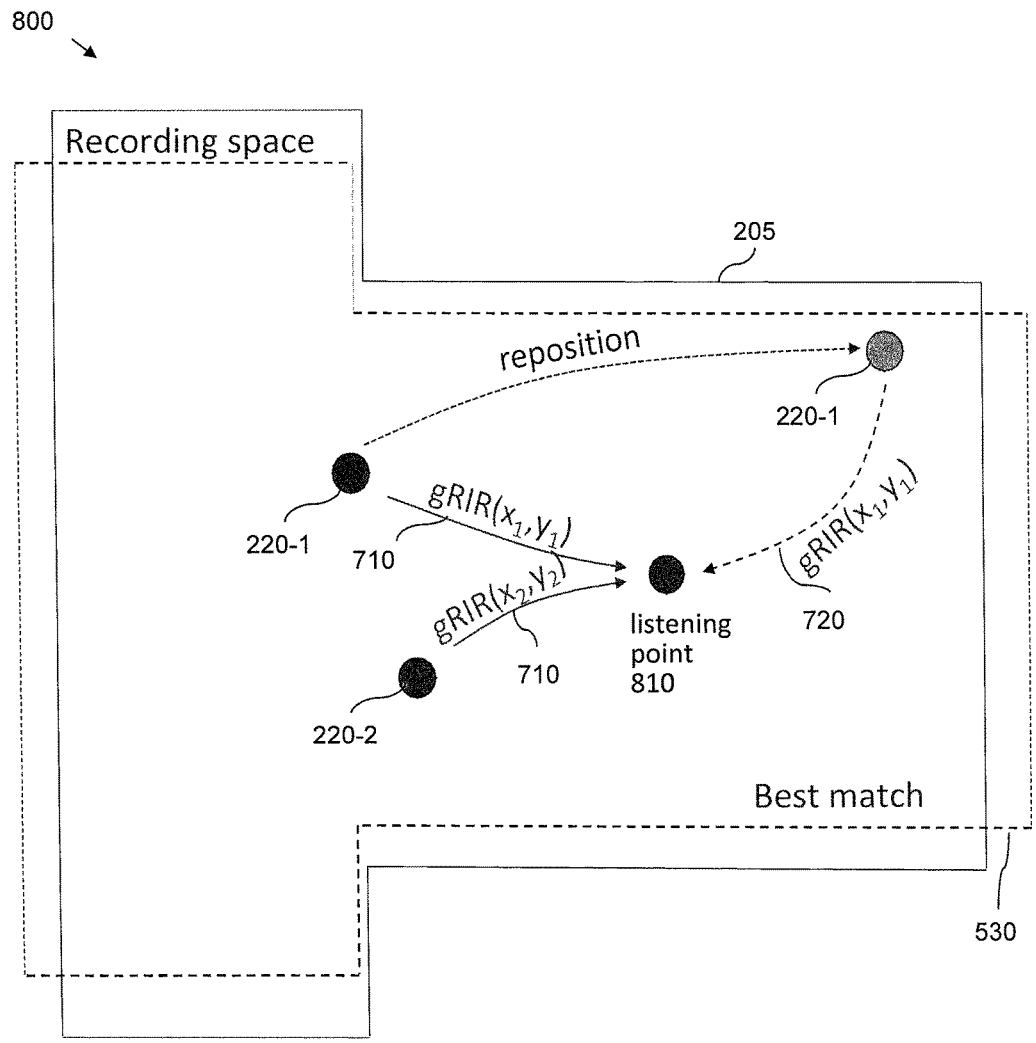
FIG. 8 is a diagram illustrating an experience stage for enhanced 6-DoF audio.

FIG. 8 illustrates an experience stage 800 of a 6-DoF solution (for example, in recording space 205).

In addition to the RIR calculation, such as described with respect to FIGS. 2 to 4, gRIRs 710 may be calculated through the use of the best matching scene geometry (gRIR). During the entire process of recording the system may keep track of how close (for example, similar) the RIRs 240 are to the gRIRs 710. If the two RIRs for all close-mic'd sources are sufficiently similar (for example, 'close enough'), the system may determine that the best matching scene geometry describes the recorded scene well and may use the gRIRs 710 to create the wet versions of the dry signals during rendering.

In instances in which gRIRs 710 are "close enough" to RIRs 240, during playback the close-up microphone signals may be separated from the microphone array signals using the RIRs. The close-up microphone signals may be convolved with the gRIRs 710 and may be rendered from arbitrary positions in the scene. The gRIRs 710 may be calculated based on the best matching known geometry 530 and may thereby change based on the position of the (repositioned) sources ($o_1$ and $o_2$) 220. This may create a more realistic experience (for example, an experience in which the characteristics of the audio in the experience conforms to real world behavior of audio in a comparable environment), than using the RIRs 240 which may not change based on the positions of the sources during playback.

Figure 9:
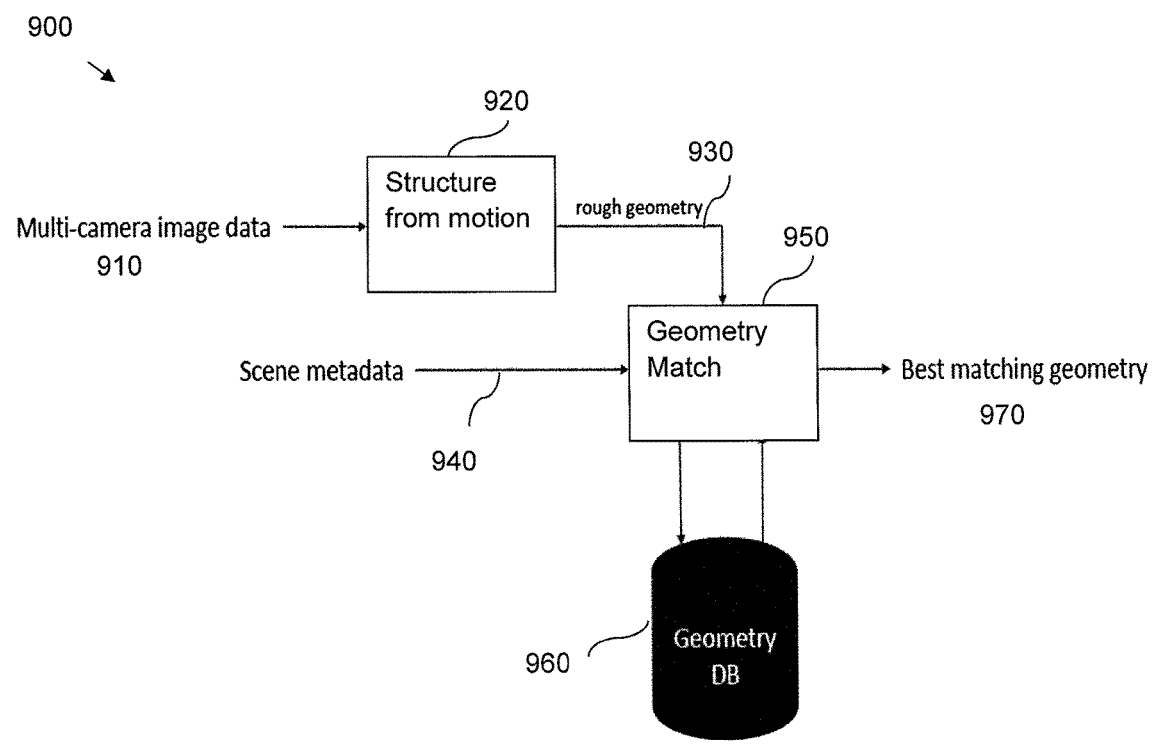
FIG. 9 illustrates a block diagram of a geometry obtaining system.

FIG. 9 illustrates a block diagram of a geometry obtaining system 900.

As shown in FIG. 9, multi-camera image data 910 may be processed via structure from motion 920 to determine a rough geometry 930. A geometry match 950 may be performed based on the rough geometry 930 and scene metadata 940. Scene metadata may be accessed 940, for example metadata that describes that the scene is a church, arena, etc. A geometry match 950 may be performed using the rough geometry 930, the scene metadata 940 and a geometry database (DB) 960, which may include different pre-calculated geometries corresponding to a variety of detailed scenes.

The geometry obtaining system 900 may have a rough 3D model of the scene that does not include information about the details in the scene. Alternatively to inferring all of the details using the camera/sensor information, the geometry obtaining system 900 may perform a search through a geometry database 960 of detailed, pre-calculated scene geometries to find the one that (most closely) matches the rough geometry 930. The rough geometry 930 may be compared to detailed geometries in a database to find the best matching geometry 970. Once a scene geometry (for example, the best matching geometry 970) has been obtained, the geometry obtaining system 900 may forward the best matching geometry 970 to game engine processing (for example, VRWorks for NVidia, etc.) to create the wet version of a close-mic signal.

The geometry obtaining system 900 may perform the geometry estimation in two stages: first geometry obtaining system 900 may find the stored room shapes which have approximately the same dimensions (width, height, depth, etc.). Then, a more detailed matching may be performed in this subset to find a best alignment for the estimated geometry to each of the candidate rooms. The alignment may be performed, for example, by evaluating different orientations of the measured geometry and calculating a mean squared error between the corners of the room in the database and the estimated geometry. The alignment minimizing the mean squared error may be chosen. This may be repeated for all the candidate rooms and the one leading to the smallest mean square error may be chosen.

For example, the system 900 may determine the centre points of the estimated geometry and the database geometry using a predefined procedure. Both the estimated geometry and the database geometry may be defined by their corner points. Note that the geometries may have different numbers of corner points. When the centre points for both the estimated and database geometry are obtained, both geometries may be placed on top of each other by matching the centre points to a predefined point, such as the origin. Then, the system 900 may evaluate the accuracy of the alignment by calculating the difference of the geometries. This may be done, for example, by calculating the squared difference between the corner points of the geometries. Alternatively, the system 900 may map points of the surface defining the estimated geometry to the database geometry, and the mean squared error may be calculated. This may be repeated by mapping the points of the database geometry to the estimated geometry, and calculating the mean squared error. The average of these error values may be used for evaluating this orientation. The system 900 may repeat the above procedure for different orientations of the measured geometry with regard to the database geometry, where different orientations are obtained by rotating the measured geometry while keeping the database geometry and the centre points static. The best match between the estimated geometry and the database geometry may be determined by the smallest mean square error across different orientations. The above procedure may be repeated for the available database geometries to select the best database geometry corresponding to the estimated geometry.

According to an example embodiment, in addition to the predefined procedure, the system 900 may utilize a (geometry volume) measure related to the difference in the volume of the two geometries as a measure of their similarities. The system 900 may use geometry volume matching in addition to other methods of determining a best match. In some instances, the system 900 may be able to obtain multiple close matches from identifying a best matching geometry to the predetermined scene geometry in a scene geometry database or the compared geometries may not have sufficiently similar shapes. The system 900 may use the geometry volume in addition to the corner error to get a best match (for example, in instances in which a group of sufficiently similar shapes have been identified by the corner error).

Figure 10:
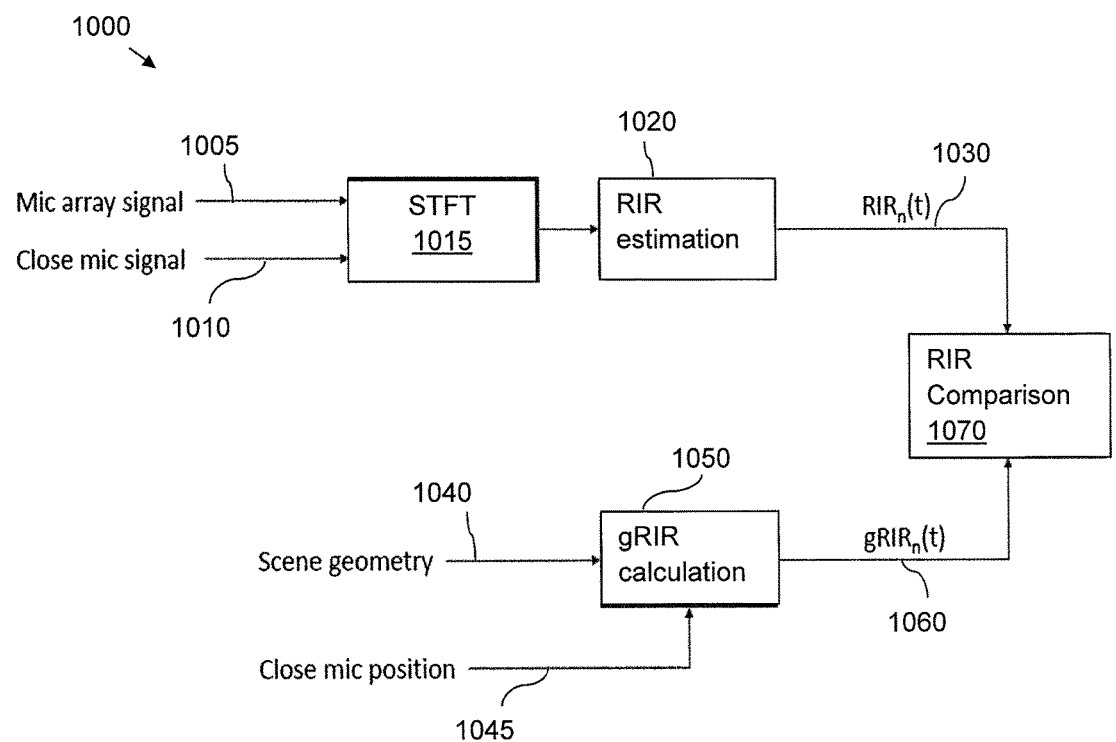
FIG. 10 illustrates a block diagram of a room impulse comparison system.

FIG. 10 illustrates a block diagram of a room impulse response comparison system 1000.

As shown in FIG. 10, room impulse response comparison system 1000 may process mic array signal 1005 and close mic signal 1010 via STFT 1015. RIR estimation 1020 may be performed on the resulting signal to determine corresponding RIRs (for example $RIR_n$ (t) 1030).

Room impulse response comparison system 1000 may process scene geometry 1040 and close mic position 1045 via gRIR calculation 1050. The resulting $gRIR_n$ (t) 1060 may be forwarded to RIR comparison 1070 with the $RIR_n$ (t) 1030.

The RIR comparison may be made to determine whether the geometry-determined RIR (gRIR) can be used instead of the measured RIR to create a perceptually plausible reverberant audio rendering using the dry signals. Thus, when the geometry determined RIR is applied to the dry recording the resulting audio should sound perceptually close enough to the actual, reverberated recording. Thus, the system may compare the RIRs to determine whether they are close enough, so that if gRIR is applied instead of RIR the differences in the audio will not be perceptually significant to an end user (for example, user will not notice significant difference). The room impulse response comparison system 1000 may apply a threshold determining how close the gRIR and RIR are required to be. Actual comparison may be performed, for example, with weighted square differences for different parts of the impulse responses.

RIR comparison 1070 may be performed by calculating the mean squared error by time-aligned room impulse responses. In some instances, based on choices input to the system, different weightings for different parts of the RIR may be used when calculating the error. For example, in some applications the early reflections may be more important and in these instances the error calculation may be determined to assign more weight to the early reflections part of the RIR. In some other applications, the late reverberation may be more important and thus that part of the RIR may be weighted more in the error calculation. In some example embodiments, spatial information of the RIRs 240 and gRIRs 710 may be taken into account when making the comparison. This may be done, for example, by performing the above error calculation across the RIRs and gRIRs 710 obtained for all the microphone array channels.

Figure 11:
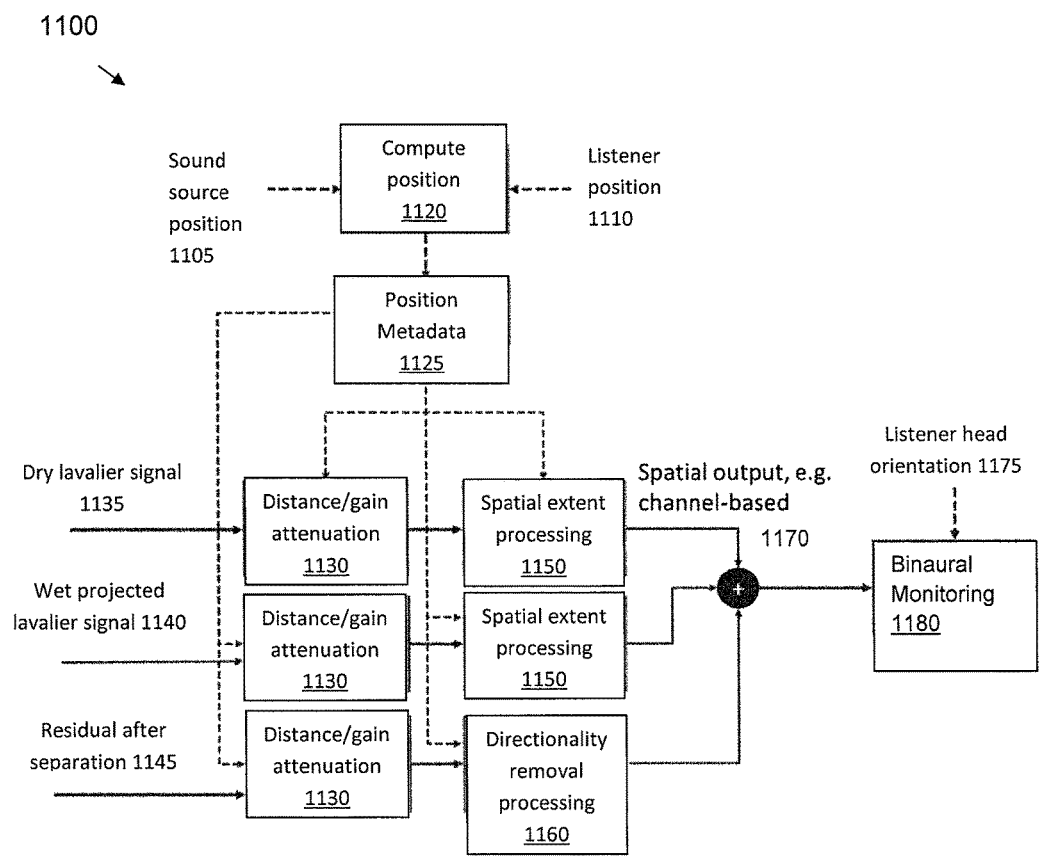
FIG. 11 illustrates a block diagram of a 6-DoF rendering system.

FIG. 11 illustrates a block diagram of an audio scene rendering system 1100 that may render an audio scene to the user.

The system 1100 may receive a dry lavalier signal 1135 and its wet projection 1140. The wet projection 1140 may have been obtained by either projecting the dry lavalier signal to a microphone array using RIRs 240 or using the gRIRs 710 obtained using the scene geometry. If the array contains multiple microphones, a wet projection 1140 may be calculated to each microphone. In this case, the wet projection 1140 may be selected as the one from the microphone closest towards the direction of arrival (DOA) of the audio source captured by the microphone.

The residual after separation 1145 may be obtained by separating the wet projection 1140 from the microphone array capture. Note that the residual, in this instance, is obtained using the 'wet' signals obtained using the estimated RIRs 240 (not the gRIRs 710).

During playback (rendering), the residual signal 1145 from the array microphone may be used as diffuse, ambiance signal during reproduction. The volumetric playback may be obtained by mixing the diffuse ambiance with sound objects created from the dry lavalier signals 1135 and the wet versions 1140 of the dry signals while creating the sensation of listener position change by applying distance/gain attenuation cues 1130 and direct-to-wet ratio to the dry lavalier signal 1135 and the wet projection 1140.

Volumetric playback may require information regarding the source position with respect to the listener. This may be implemented in two stages: first, recalculating the source position taking into account listener translation, and then head orientation may be considered.

The system 1100 may receive (or, for example, access) a listener position 1110 and source position 1105 in Cartesian coordinates (x, y, z). The system 1100 may calculate (for example, compute) 1120 the source position in polar coordinates (azimuth, elevation, distance) with respect to the current listener position 1110. Position metadata 1125 may be provided for distance/gain attenuation 1130.

Distance/gain attenuation 1130 may be used to adjust the gain for the dry lavalier source 1135. For example, the gain may be inversely proportional to the distance, that is, gain=1.0/distance.

The input signals may then be input to the spatial extent processing 1150. Spatial extent processing 1150 may perform two things: spatial extent processing 1150 may spatially position the source given the azimuth and elevation, and control the spatial extent (width or size) of the sources as desired. In some example embodiments, the use of spatial extent may be optional and the spatial extent may be omitted. In other example embodiments, the spatial extent may be used to render large sound sources so that they appear to emanate sound from a larger area, for example, an area corresponding to their physical dimensions. Alternatively or in addition to these example embodiments directed to rendering large sound sources so that they appear to emanate sound from a larger area, spatial extent may be used to render the wet projection with a larger area such that the reverberation appears to come from the surroundings of the listener rather than only from the direction of the sound source.

The residual after separation may be spatially extended to 360 degrees or other suitable amount. According to an example scenario, the listener may be inside a space and the suitable amount in this instance may be 360 degrees. If the listener is not fully inside the space where the residual capture has been made, the suitable amount may be such that the spatial extent corresponds to the size of geometry perceived from the listening position. In addition to spatially extending the signal, the system 1100 may remove the directionality 1160 from the residual. As the directionality is removed along with the most dominant sources, the residual may be mostly diffuse ambiance. In this case, the residual may not need to be affected by listening position as it does not have distance dependent components.

Spatial extent processing may include changing a size of the spatial extent based on a distance from the audio object. According to an example embodiment, an exception may occur in instances when the listener position is very far from the capture. When the listener position is far enough from the capture, the spatial extent of the residual may start to decrease proportionally to the distance. For example, the spatial extent may be scaled by the inverse of the distance from the limit where it starts to decrease. A suitable limit (for example, at which the listener position is far enough) for starting to decrease the extent may be the limit where the user exits the capture space. The scaling of the spatial extent may be a user settable parameter where the spatial extent starts becoming narrower. The scaling may be determined directly after the user is out of the space or some additional distance. A predefined threshold may be used to determine when distance/gain attenuation is to be applied, including, in some instances, during spatial extent processing. The threshold may apply to the spatial extent size.

For the wet projection 1140 and the diffuse residual 1145, the distance/gain attenuation may have an effect only when the listener is farther than a predefined threshold from the capture setup. The threshold may be defined by defining a boundary around the capture, which may correspond to, for example, to the locations of physical walls where the capture was done. Alternatively, the predefined threshold may be an artificial boundary. When the listener is outside this boundary, gain attenuation may be applied as gain=1/sqrt (distance_from_boundary) (for example, gain is the inverse of the square root of the distance from boundary).

After spatial extent processing 1150, the output 1170 is in spatial format, for example, loudspeaker (for example, 4.0) format. The spatial outputs may be summed, and passed to binaural rendering 1180. Binaural rendering 1180 takes into account the listener head orientation (yaw, pitch, roll) 1175, and determines the appropriate head-related-transfer-function (HRTF) filters for the left and right ear for each loudspeaker channel, and creates a signal suitable for headphone listening. The output may be determined using alternative processes. For example, according to an example embodiment the loudspeaker output may be experienced directly by the user. In other example embodiments, the system may create the output in a format other than the loudspeaker domain, for example, in the binaural domain or as first order ambisonics or higher order ambisonics (for example, audio that covers sound sources above and below the user as well as horizontally placed sound sources).

Figure 12:
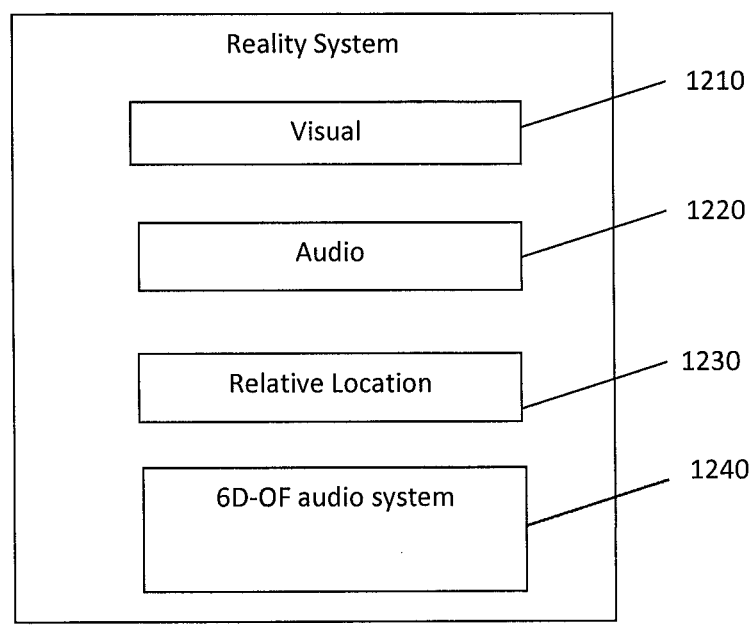
FIG. 12 is a diagram illustrating a reality system comprising features of an example embodiment.

Referring to FIG. 12, a diagram is shown illustrating a reality system 1200 incorporating features of an example embodiment. The reality system 1200 may be used by a user for augmented-reality (AR), virtual-reality (VR), or presence-captured (PC) experiences and content consumption, for example, which incorporate free-viewpoint audio. Although the features described may be used to implement the example embodiments shown in the drawings, it should be understood that features can be embodied in many alternate forms of embodiments.

The system 1200 generally comprises a visual system 1210, an audio system 1220, a relative location system 1230 and an enhanced 6-DoF audio system 1240. The visual system 1210 is configured to provide visual images to a user. For example, the visual system 1210 may comprise a virtual reality (VR) headset, goggles or glasses. The audio system 1220 is configured to provide audio sound to the user, such as by one or more speakers, a VR headset, or ear buds for example. The relative location system 1230 is configured to sense a location of the user, such as the user's head for example, and determine the location of the user in the realm of the reality content consumption space. The movement in the reality content consumption space may be based on actual user movement, user-controlled movement, and/or some other externally-controlled movement or pre-determined movement, or any combination of these. The user is able to move and turn their head in the content consumption space of the free-viewpoint. The relative location system 1230 may be able to change what the user sees and hears based upon the user's movement in the real-world; that real-world movement changing what the user sees and hears in the free-viewpoint rendering.

The enhanced 6-DoF audio system 1240 is configured to implement a process providing enhanced 6-DoF audio. The enhanced 6-DoF audio system 1240 may implement methods, components and systems as described herein with respect to FIGS. 1 to 12.

Figure 13:
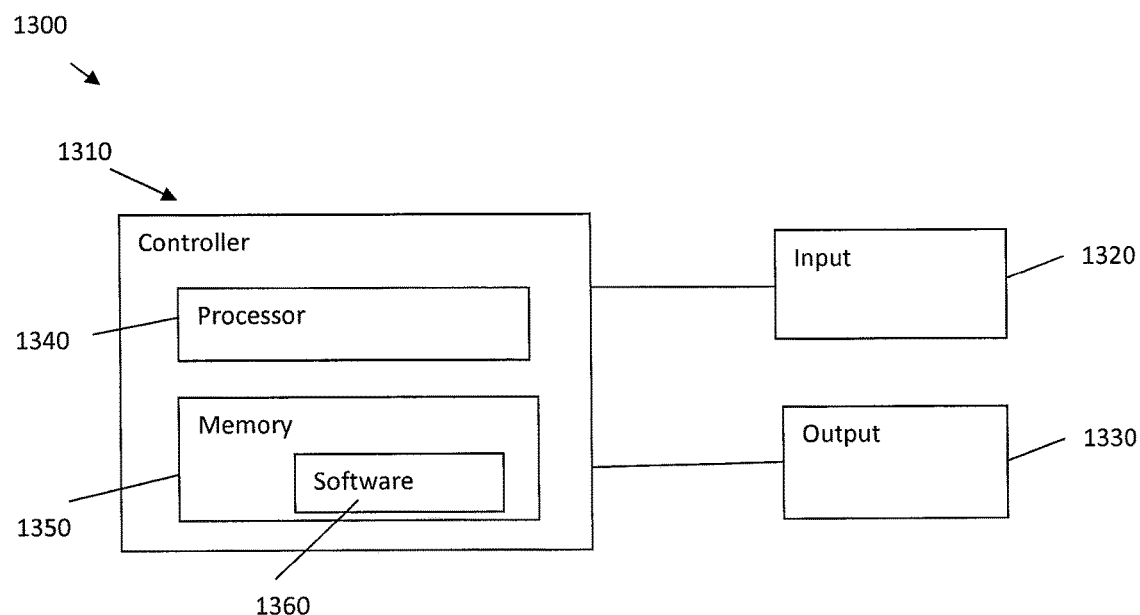
FIG. 13 is a diagram illustrating some components of the system shown in FIG. 12.

Referring also to FIG. 13, a system 1300 generally comprises one or more controllers 1310, one or more inputs 1320 and one or more outputs 1330. The input(s) 1320 may comprise, for example, location sensors of the relative location system 1230 and the enhanced 6-DoF audio system 1240, rendering information for enhanced 6-DoF audio system 1240, reality information from another device, such as over the Internet for example, or any other suitable device for inputting information into the system 1300. The output(s) 1330 may comprise, for example, a display on a VR headset of the visual system 1210, speakers of the audio system 1220, and a communications output to communication information to another device. The controller(s) 1310 may comprise one or more processors 1340 and one or more memory 1350 having software 1360 (or machine-readable instructions)

Figure 14:
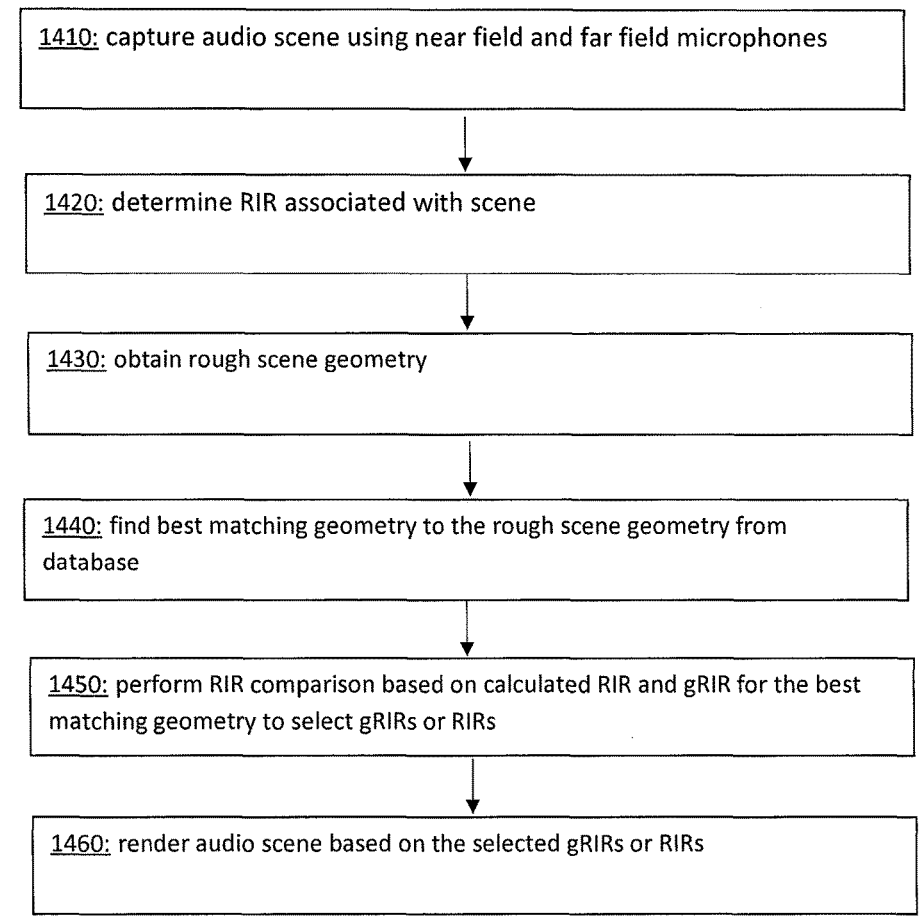
FIG. 14 is a diagram illustrating an example method.

FIG. 14 is an example flow diagram illustrating a process 1400 of providing enhanced 6-DoF audio. Process 1400 may be performed by a device (or devices) associated with rendering 6-DoF audio.

At block 1410, an audio scene may be captured using near field and far field microphones, for example, a microphone array and close-up microphones, on important sources.

At block 1420, RIRs associated with the audio scene may be determined (for example, in a similar manner as described herein above with respect to FIGS. 2-4). The RIRs may be determined for each close-up microphone to each of the microphone array microphones. The RIRs may be calculated on an (audio) frame-by-frame basis and may thus change over time.

At block 1430, a predetermined scene geometry may be accessed. For example, the predetermined scene geometry may be a rough scene geometry that is determined in a similar manner as described with respect to FIGS. 5 and 6.

At block 1440, a best matching geometry to the predetermined scene geometry may be determined based on scene geometries stored in a database (for example, in a similar manner as described herein above with respect to FIG. 9).

At block 1450, an RIR comparison may be performed based on the calculated RIR 240 (from step 1420) and the gRIRs 710 corresponding to the best matching geometry (from step 1440). The RIR comparison may be performed in a similar manner as described herein above with respect to FIG. 10. RIRs may be selected between the RIRs 240 and gRIRs 710 based on the comparison.

At block 1460, a volumetric audio scene experience may be rendered using the selected RIRs (RIRs 240 or gRIRs 710), for example, in a similar manner as described with respect to FIG. 11 herein above. The volumetric rendering of the scene may include rendering of different listening positions than the point of capture.

Features as described herein may provide technical advantages and/or enhance the end-user experience. For example, the system may provide an automatic method for obtaining room impulse responses for different parts of a room. The system may remove the need for performing exhaustive RIR measurements at different portions of the room, instead using an analysis of the scene geometry. The analysis used by the system may involve less measurements and take less time than exhaustive RIR measurements.

Another benefit of the example embodiments is that the system enables using either measured room impulse responses or calculated ones, and selecting between these automatically if the calculated ones are sufficient for the process.

Another benefit of the example embodiments is that in instances in which the calculated RIRs are used, a more immersive experience may be offered for the listener. This is due to the 'wet' versions of the audio objects adjusting their properties based on their positions in the obtained geometry. Thus the wet versions of the audio objects may behave more realistically than audio objects determined using the measured room impulses.

An example method may comprise receiving an audio scene including at least one source captured using at least one source using at least one near field microphone and at least one far field microphone, determining at least one room-impulse-response (RIR) associated with the audio scene based on the at least one near field microphone and the at least one far field microphone, accessing a predetermined scene geometry corresponding to the audio scene, identifying a best matching geometry to the predetermined scene geometry in a scene geometry database, performing RIR comparison based on the at least one RIR and at least one geometric RIR associated with the best matching geometry, and rendering an audio scene experience based on a result of the RIR comparison.

In accordance with an example embodiment the method may comprise convolving a sound source signal from the at least one near field microphone with a system impulse response for the audio scene to determine the at least one RIR.

In accordance with an example embodiment the method may comprise accessing a plurality of stored scene geometries that have approximately same dimensions as the predetermined scene geometry; calculating a mean squared error between corners of each of the plurality of stored scene geometries in the scene geometry database and the predetermined scene geometry; and identifying at least one best match for the predetermined scene geometry based on the mean squared error of each of the plurality of stored scene geometries and the predetermined scene geometry.

In accordance with an example embodiment the method may comprise determining a geometry volume difference between each of a plurality of best matches and the predetermined scene geometry as a measure of similarity; and selecting one of the plurality of best matches with an alignment minimizing the geometry volume difference.

In accordance with an example embodiment the method may comprise calculating the mean squared error by time-aligned room impulse responses.

In accordance with an example embodiment the method may comprise providing different weightings for different parts of the RIR when calculating the mean squared error.

In accordance with an example embodiment the method may comprise at least one of: receiving the rough scene geometry via scanning by a mobile device; receiving the rough scene geometry via a drawing; and determining the rough scene geometry using structure from motion based on multi-camera image data.

In accordance with an example embodiment the method may comprise calculating a source position of the at least one source in polar coordinates with respect to a current listener position; applying distance attenuation to adjust a gain for the at least one near field microphone; and performing spatial extent processing.

In accordance with an example embodiment the method may comprise spatially positioning the source based on azimuth and elevation; and controlling a spatial extent of the at least one source.

In accordance with an example embodiment the method may comprise applying the distance attenuation only when the listener position is farther than a predefined threshold from a capture area from the at least one near field microphone and the at least one far field microphone.

In accordance with an example embodiment wherein the predefined threshold is defined by one of a physical boundary around the capture area and a programmed boundary around the capture area.

An example apparatus may comprise at least one processor; and at least one non-transitory memory including computer program code, the at least one memory and the computer program code configured to, with the at least one processor, cause the apparatus to: receive an audio scene including at least one source captured using at least one source using at least one near field microphone and at least one far field microphone, determine at least one room-impulse-response (RIR) associated with the audio scene, determine a rough scene geometry associated with the audio scene, identify a best matching geometry to the rough scene geometry in a scene geometry database, perform RIR comparison based on the at least one RIR and at least one geometric RIR associated with the best matching geometry, and render an audio scene experience based on a result of the RIR comparison.

In accordance with an example embodiment the apparatus may access a plurality of stored scene geometries that have approximately same dimensions as the rough scene geometry; and identify a best alignment for the rough scene geometry to each of the plurality of stored scene geometries.

In accordance with an example embodiment the apparatus may evaluating different orientations of the rough scene geometry; calculating a mean squared error between corners of each of the plurality of stored scene geometries in the scene geometry database and the rough scene geometry; and selecting one of the plurality of stored scene geometries with an alignment minimizing the mean squared error.

In accordance with an example embodiment the apparatus may calculate the mean squared error by time-aligned room impulse responses.

In accordance with an example embodiment the apparatus may provide different weightings for different parts of the RIR when calculating the mean squared error.

In accordance with an example embodiment the apparatus may at least one of: receive the rough scene geometry via scanning by a mobile device; receive the rough scene geometry via a drawing; and determine the rough scene geometry using structure from motion.

In accordance with an example embodiment the apparatus may calculate a source position of the at least one source in polar coordinates with respect to a current listener position; apply gain attenuation to adjust a gain for the at least one near field microphone; and perform spatial extent processing.

In accordance with an example embodiment the apparatus may apply the distance attenuation only when the listener position is farther than a predefined threshold from a capture area from the at least one near field microphone and the at least one far field microphone.

In accordance with an example embodiment the apparatus may perform binaural rendering that takes into account a user head orientation, and determines head-related-transfer-function (HRTF) filters for each of left ear and right ear loudspeaker channels.

An example apparatus may be provided in a non-transitory program storage device, such as memory 1350 shown in FIG. 13 for example, readable by a machine, tangibly embodying a program of instructions executable by the machine for performing operations, the operations comprising: capturing, by an augmented reality (AR) device.

In accordance with another example, an example apparatus comprises: means for capturing an audio scene including at least one source using at least one near field microphone and at least one far field microphone, means for determining at least one room-impulse-response (RIR) associated with the audio scene, means for accessing a predetermined scene geometry associated with the audio scene, means for identifying a best matching geometry to the rough scene geometry in a scene geometry database, means for performing RIR comparison based on the at least one RIR and at least one geometric RIR associated with the best matching geometry, and means for rendering an audio scene experience based on a result of the RIR comparison.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
receiving an audio scene including at least one source captured using at least one near field microphone and at least one far field microphone;
determining at least one room-impulse-response (RIR) associated with the audio scene based on the at least one near field microphone and the at least one far field microphone;
accessing a predetermined scene geometry corresponding to the audio scene;
identifying a best matching geometry to the predetermined scene geometry in a scene geometry database;
performing RIR comparison based on the at least one RIR and at least one geometric RIR associated with the best matching geometry; and
rendering a volumetric audio scene experience based on a result of the RIR comparison.

2. The method as in claim 1, wherein determining the at least one RIR associated with the audio scene further comprises:
convolving a sound source signal from the at least one near field microphone with a system impulse response for the audio scene to determine the at least one RIR.

3. The method as in claim 1, wherein identifying the best matching geometry further comprises:
accessing a plurality of stored scene geometries that have approximately same dimensions as the predetermined scene geometry;
calculating a mean squared error between corners of each of the plurality of stored scene geometries in the scene geometry database and the predetermined scene geometry; and
identifying at least one best match for the predetermined scene geometry based on the mean squared error of each of the plurality of stored scene geometries and the predetermined scene geometry.

4. The method as in claim 3, wherein the at least one best match comprises a plurality of best matches and identifying the at least one best match further comprises:
determining a geometry volume difference between each of the plurality of best matches and the predetermined scene geometry as a measure of similarity.

5. The method as in claim 1, wherein performing the RIR comparison further comprises:
calculating the mean squared error by time-aligned room impulse responses.

6. The method as in claim 5, further comprising:
providing different weightings for different parts of the RIR when calculating the mean squared error.

7. The method as in claim 1, wherein determining the rough scene geometry further comprises:
at least one of:
receiving the rough scene geometry via scanning by a mobile device;
receiving the rough scene geometry via a drawing; and determining the rough scene geometry using structure from motion based on multi-camera image data.

8. The method as in claim 1, wherein rendering the audio scene experience further comprises:
calculating a source position of the at least one source in polar coordinates with respect to a current listener position;
applying distance/gain attenuation to adjust a gain for the at least one near field microphone; and
performing spatial extent processing.

9. The method as in claim 8, wherein performing spatial extent processing further comprises:
spatially positioning the source based on azimuth and elevation; and
controlling a spatial extent of the at least one source.

10. The method as in claim 8, wherein performing spatial extent processing further comprises:
changing a size of the spatial extent based on a distance from an audio source.

11. The method as in claim 10, wherein the predefined threshold is defined by one of a physical boundary around the capture area and a programmed boundary around the capture area.

12. The method as in claim 1, wherein rendering the audio scene experience further comprises:
performing binaural rendering that takes into account a user head orientation, and determines head-related-transfer-function (HRTF) filters for each of left ear and right ear loudspeaker channels.

13. An apparatus comprising:
at least one processor; and
at least one non-transitory memory including computer program code, the at least one memory and the computer program code configured to, with the at least one processor, cause the apparatus to:
receive an audio scene including at least one source captured using at least one near field microphone and at least one far field microphone;
determine at least one room-impulse-response (RIR) associated with the audio scene based on the at least one near field microphone and the at least one far field microphone;
access a predetermined scene geometry corresponding to the audio scene;
identify a best matching geometry to the predetermined scene geometry in a scene geometry database;
perform RIR comparison based on the at least one RIR and at least one geometric RIR associated with the best matching geometry; and
render an audio scene experience based on a result of the RIR comparison.

14. An apparatus as in claim 13, wherein, when determining the at least one RIR associated with the audio scene, the at least one memory and the computer program code are configured to, with the at least one processor, cause the apparatus to:
convolve a sound source signal from the at least one near field microphone with a system impulse response for the audio scene to determine the at least one RIR.

15. An apparatus as in claim 13, wherein, when identifying the best matching geometry, the at least one memory and the computer program code are configured to, with the at least one processor, cause the apparatus to:
access a plurality of stored scene geometries that have approximately same dimensions as the predetermined scene geometry;
calculate a mean squared error between corners of each of the plurality of stored scene geometries in the scene geometry database and the predetermined scene geometry; and
identify at least one best match for the predetermined scene geometry based on the mean squared error of each of the plurality of stored scene geometries and the predetermined scene geometry.

16. An apparatus as in claim 15, wherein the at least one best match comprises a plurality of best matches, and wherein when identifying the at least one best match, the at least one memory and the computer program code are configured to, with the at least one processor, cause the apparatus to:
determine a geometry volume difference between each of the plurality of best matches and the predetermined scene geometry as a measure of similarity.

17. An apparatus as in claim 13, wherein, when performing the RIR comparison, the at least one memory and the computer program code are configured to, with the at least one processor, cause the apparatus to:
calculate the mean squared error by time-aligned room impulse responses.

18. An apparatus as in claim 17, wherein the at least one memory and the computer program code are configured to, with the at least one processor, cause the apparatus to:
provide different weightings for different parts of the RIR when calculating the mean squared error.

19. An apparatus as in claim 13, wherein, when rendering the audio scene experience, the at least one memory and the computer program code are configured to, with the at least one processor, cause the apparatus to:
calculate a source position of the at least one source in polar coordinates with respect to a current listener position;
apply distance/gain attenuation to adjust a gain for the at least one near field microphone; and
perform spatial extent processing.

20. A non-transitory program storage device readable by a machine, tangibly embodying a program of instructions executable by the machine for performing operations, the operations comprising:
receiving an audio scene including at least one source captured using at least one source using at least one near field microphone and at least one far field microphone;
determining at least one room-impulse-response (RIR) associated with the audio scene based on the at least one near field microphone and the at least one far field microphone;
determining a rough scene geometry associated with the audio scene;
identifying a best matching geometry to the rough scene geometry in a scene geometry database;
performing RIR comparison based on the at least one RIR and at least one geometric RIR associated with the best matching geometry; and
rendering an audio scene experience based on a result of the RIR comparison.

* * * * *